United States Patent
Harada

(10) Patent No.: US 11,800,876 B2
(45) Date of Patent: Oct. 31, 2023

(54) DOUGH FOR FOOD, PRODUCING METHOD THEREFOR, AND MOLD MEMBER FOR PRODUCING DOUGH

(71) Applicant: SEVENS CO., LTD., Yasu (JP)

(72) Inventor: Yujiro Harada, Yasu (JP)

(73) Assignee: SEVENS CO., LTD., Yasu (JP)

( * ) Notice: Subject to any disclaimer, the term of this patent is extended or adjusted under 35 U.S.C. 154(b) by 242 days.

(21) Appl. No.: 16/087,797

(22) PCT Filed: Mar. 22, 2017

(86) PCT No.: PCT/JP2017/011531
§ 371 (c)(1),
(2) Date: Sep. 24, 2018

(87) PCT Pub. No.: WO2017/170064
PCT Pub. Date: Oct. 5, 2017

(65) Prior Publication Data
US 2019/0110485 A1   Apr. 18, 2019

(30) Foreign Application Priority Data

Mar. 29, 2016 (JP) ................................ 2016-065761

(51) Int. Cl.
| | | |
|---|---|---|
| *A21D 13/33* | (2017.01) | |
| *A21D 15/02* | (2006.01) | |
| *A21D 13/44* | (2017.01) | |
| *A21C 15/02* | (2006.01) | |
| *A21D 13/40* | (2017.01) | |

(52) U.S. Cl.
CPC ............ *A21D 13/33* (2017.01); *A21C 15/025* (2013.01); *A21D 13/40* (2017.01); *A21D 13/44* (2017.01); *A21D 15/02* (2013.01)

(58) Field of Classification Search
CPC ...... A21C 15/025; A21D 13/33; A21D 13/40; A21D 13/44; A21D 15/02
See application file for complete search history.

(56) References Cited

U.S. PATENT DOCUMENTS

| | | | | |
|---|---|---|---|---|
| D56,488 S | * | 10/1920 | Winder | |
| 3,410,691 A | * | 11/1968 | Stanley | A21D 13/33 426/94 |
| 4,929,458 A | | 5/1990 | Smietana | |
| 2004/0241300 A1 | * | 12/2004 | Cole | A21D 15/02 426/499 |
| 2006/0292276 A1 | * | 12/2006 | Huxel | A21B 5/026 426/505 |

FOREIGN PATENT DOCUMENTS

| | | |
|---|---|---|
| JP | S59-146545 A | 8/1984 |
| JP | H09-154471 A | 6/1997 |
| JP | 2001-204367 A | 7/2001 |
| JP | 2004-73119 A | 3/2004 |
| JP | 2005-218367 A | 8/2005 |
| JP | 2007-330130 A | 12/2007 |
| JP | 2009-39094 A | 2/2009 |
| JP | 2009-247325 A | 10/2009 |

OTHER PUBLICATIONS https://web.archive.org/web/20120109071435/https://www.auntannie.com/Christmas/ConeOrnament (Year: 2012).*
Homemade Samosa Wrappers ( Samosa dough)—YouTube (Year: 2013).*
Jun. 6, 2017 Written Opinion issued in International Patent Application No. PCT/JP2017/011531.
Jun. 6, 2017 International Search Report issued in International Patent Application No. PCT/JP2017/011531.
Jul. 31, 2018 Office Action issued in Japanese Office Action No. 2018-509138.
The Crepe, Morinaga & Company, Internet Archive [online], Dec. 26, 2012, Internet <URL: https://web.archive.org/web/20121226021524/http://www.morinaga.co.jp/ice/syouhin/the_crepe/>.
Jun. 9, 2021 Office Action issued in Chinese Patent Application No. 201780021539.7.

* cited by examiner

*Primary Examiner* — Jyoti Chawla
(74) *Attorney, Agent, or Firm* — Oliff PLC

(57) ABSTRACT

A producing method for a dough for food in which a filling is wrapped with a dough sheet. The producing method includes the steps of: a) thinly extending and baking a dough liquid so as to prepare a thin baked dough; b) winding the thin baked dough around a mold member narrowed toward a tip; c) freezing the thin baked dough wound around the mold member so as to prepare a three-dimensional dough hardened in a manner wound around the mold member; and d) detaching the mold member from the three-dimensional dough. The method can speedily provide food in which a filling is wrapped with a dough sheet such as a crepe.

4 Claims, 4 Drawing Sheets

DOUGH FOR FOOD, PRODUCING METHOD THEREFOR, AND MOLD MEMBER FOR PRODUCING DOUGH

TECHNICAL FIELD

The present invention relates to food in which a filling is wrapped with a dough sheet.

BACKGROUND ART

There are a lot of food in which a filling is wrapped with a dough sheet. One of such food is a crepe. A crepe is food obtained by thinly extending a dough liquid containing flour, an egg, and the like in mixture in a circular shape, followed by baking, so as to prepare a dough, putting a filling such as cream or a fruit on the resultant dough, and then, wrapping or folding the dough.

The good mouthfeel of a crepe is achieved by thinly and uniformly baking a dough. However, since it is difficult to bake a thin dough in a uniform thickness, the skill of a worker is required. In view of this, Patent Literature 1, for example, discloses a machine capable of thinly and uniformly baking a dough for a crepe.

CITATION LIST

Patent Literature

Patent Literature 1: JP H09-154471 A

SUMMARY OF INVENTION

Technical Problem

In the general sales system, a filling is ordered in a crepe shop, a dough is baked on the spot, the ordered filling is put on the baked dough, followed by folding or wrapping, and finally, the resultant crepe is served to a customer. In the above-described sales system, sales totally depend upon how fast the order is completed (that is, how fast a crepe can be served after the order is accepted).

However, even by a skilled worker or even by using the machine disclosed in Patent Literature 1, it takes a certain period of time to bake a dough. If, then, putting a filling on a dough, and wrapping or folding the crepe are made in a shorter period of time, the finished appearance of the crepe may be bad. As a consequence, it is not easy to shorten a period of time until a crepe is served after the order is accepted.

The present invention has been accomplished in view of the above-described problem to be solved, and therefore, an object of the present invention is to speedily provide food such as a crepe in which a filling is wrapped with a dough sheet.

Solution to Problem

The present invention accomplished to solve the above-described problem is featured by a producing method for a dough for food in which a filling is wrapped with a dough sheet, the producing method including the steps of:

a) thinly extending and baking a dough liquid so as to prepare a thin baked dough;

b) winding the thin baked dough around a mold member narrowed toward a tip;

c) freezing the thin baked dough wound around the mold member so as to prepare a three-dimensional dough hardened in a manner wound around the mold member; and d) detaching the mold member from the three-dimensional dough.

With this configuration, if the three-dimensional dough is unfrozen just before receiving an order from a customer (or, otherwise, while the three-dimensional dough is still frozen), food can be served to the customer merely by work for putting a filling into an opening formed at the three-dimensional dough. That is to say, it is possible to speedily serve food in which a filling is wrapped with a dough sheet.

It is preferable that the producing method should further include the step of:

e) storing the three-dimensional dough detached from the mold member in a freezing manner.

With this configuration, for example, if the three-dimensional dough is previously produced and stored in a frozen manner (preferably, a plurality of three-dimensional doughs is previously produced and stocked in a frozen manner), and only the dough to be sold to a customer is unfrozen at that time, the food is efficiently served without any waste. The words "in a freezing manner" herein means keeping the frozen state by controlling temperature by the use of a freezer or the like.

Preferably, in the producing method, the thin baked dough is wound around the mold member such that a portion of the thin baked dough covers the narrowed tip of the mold member.

With this configuration, the portion of the thin baked dough covering the narrowed tip of the mold member forms the bottom of the three-dimensional dough (i.e., a portion for closing an end opposite to the opening). That is to say, the three-dimensional dough having a closed bottom is obtained. Consequently, it is possible to increase the range of selection of fillings that can be put into the three-dimensional dough.

Preferably, in the producing method, the mold member is formed into the shape of a truncated circular cone, a truncated polygonal cone, a circular cone, or a polygonal cone.

Preferably, in the producing method, the mold member is made from an arcuate elastic thin plate that has an arcuate cutout on a vertex side. The shape of a truncated circular cone is achieved by rolling the thin plate in such a manner that both portions in an arcuate direction overlap each other.

With this configuration, when the mold member is deformed such that the area of overlapping portions of the thin plate enlarges (i.e., the mold member is made narrower), the mold member is separated from the three-dimensional dough and readily detached from the three-dimensional dough. In this detachment manner, the mold member can be detached without causing any damage in the dough even if the dough is fragile and delicate.

Preferably, in the mold member according to the producing method in the above-described mode, the mold member is provided with a rising piece that rises inward on a side end located inside.

With this configuration, while fixing the outer side, when the inner side is slid along the inner circumferential surface of the mold member (i.e., is moved relatively to the outer side) using the rising piece as a hook with a finger or the like, the mold member is readily deformed (deformed in such a manner as to enlarge the area of the overlapping portion). Thus, the dough wound around the mold member can be readily detached from the mold member.

The present invention in another aspect is featured by a dough for food in which a filling is wrapped with a dough sheet, the shape of the dough being rigid in a frozen state, wherein one end is closed and the diameter is enlarged toward the other end.

The present invention in a further aspect is featured by a mold member for use in producing a dough for food in which a filling is wrapped with a dough sheet. The mold member includes a circular conical or polygonal conical dough winding portion, wherein an arcuate thin plate is rolled such that its both sides overlap each other.

It is preferable that in the mold member, the thin plate is cut in an arcuate manner at the center thereof, and the dough winding portion should be formed into the shape of a truncated cone.

Moreover, it is preferable that the mold member further include a rising piece that rises inward on the side of an end of the thin plate located on the inner circumferential side of the dough winding portion.

With this configuration, the dough for food in which the filling is wrapped with the dough sheet is rigid (its shape is rigid) in the frozen state in the shape in which one end is closed and the diameter is enlarged toward the other end. As a consequence, if the three-dimensional dough is unfrozen just before receiving an order from a customer (or, otherwise, while the three-dimensional dough is still frozen), the food can be served to a customer only by work for putting the filling into an opening formed at the three-dimensional dough. In other words, it is possible to speedily serve the food in which the filling is wrapped with the dough sheet.

Advantageous Effects of Invention

According to the present invention, it is possible to serve food to a customer only by work for putting a filling into an opening formed at a dough. More specifically, it is possible to speedily serve food in which a filling is wrapped with a dough sheet.

DESCRIPTION OF EMBODIMENTS

An embodiment according to the present invention will be described below with reference to the attached drawings. Here, the embodiment merely embodies the present invention, but does not restrict the technical scope of the present invention.

<1. Producing Method for Dough>

Figure 1:
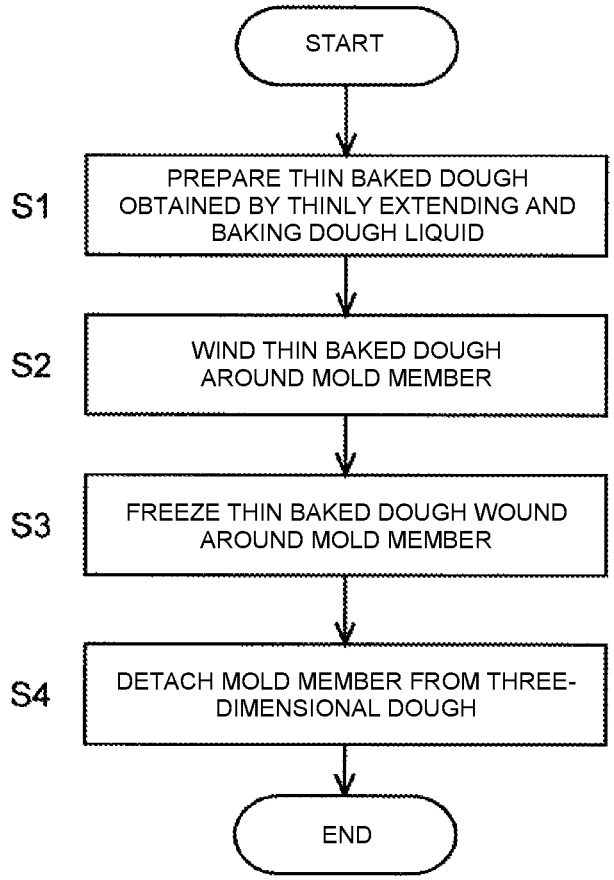
FIG. 1 is a flowchart illustrating a producing method for a dough for food according to an embodiment.
Figure 2:
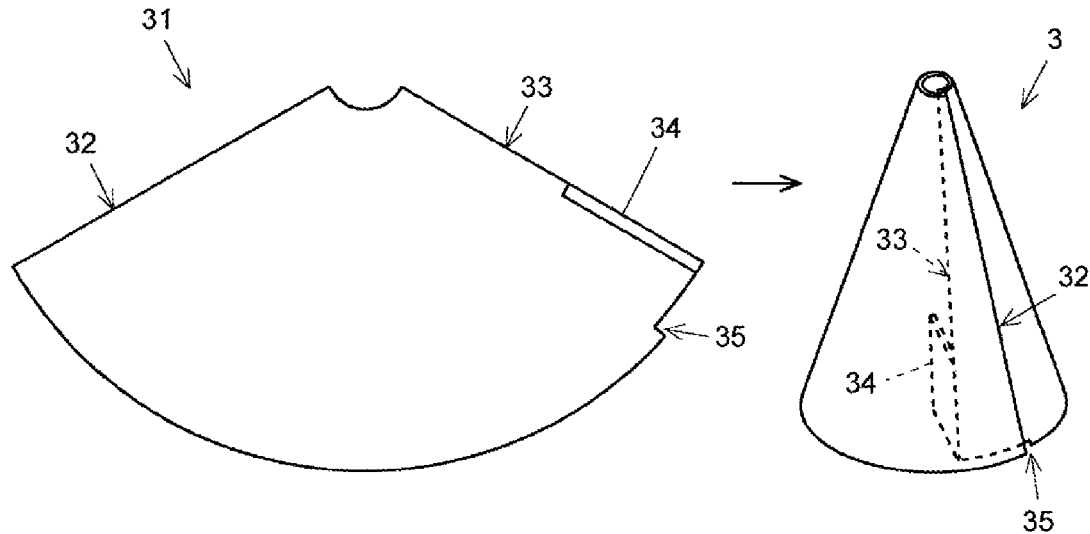
FIG. 2 is a view showing the configuration of a mold member.

Explanation will be made on a producing method for a dough for food (here, e.g., a crepe) in which a filling is wrapped with a dough sheet with reference to FIG. 1 to FIG. 6. FIG. 1 is a flowchart illustrating the producing method. FIG. 2 is a view showing the configuration of a mold member 3 for use in the producing method. FIG. 3 to FIG. 6 are views showing the steps of the producing method.

Step S1: First, a dough (a thin baked dough) 2 is prepared by thinly extending a dough liquid 1 and baking it.

Figure 3:
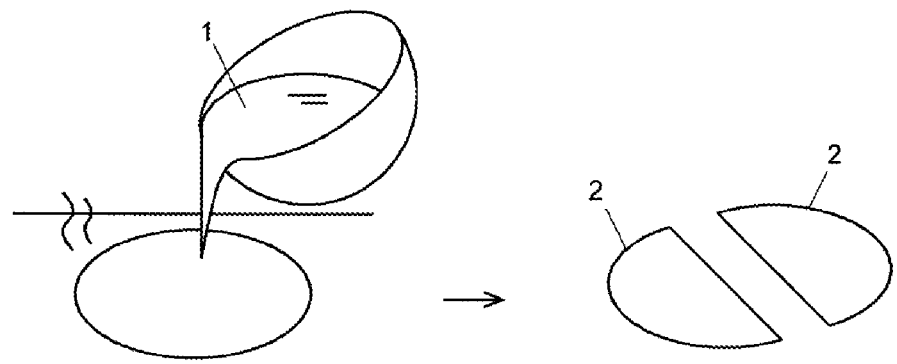
FIG. 3 is a view showing a first step.

More specifically, a dough obtained by thinly extending and baking the dough liquid 1 on a heated iron plate in a circular shape is cut in half, thereby preparing a semi-circular thin baked dough 2, as shown in, for example, FIG. 3. Alternatively, a semi-circular thin baked dough 2 may be prepared by thinly extending and baking the dough liquid 1 on a heated iron plate in a semi-circular shape. This step S1 may be performed by a machine or manually.

The thin baked dough 2 has, for example, a thickness of several millimeters or less and a diameter of 38 centimeters.

It is preferable that the dough liquid 1 should contain, for example, 29% by weight of an egg liquid, 29% by weight of water, 3% by weight of sugar, 32% by weight of flour, and 6% by weight of oil in mixture. As is obvious later, in this producing method, since the dough is once frozen before it is eaten, the use of the dough liquid 1 prepared in the above-described ratio can keep a moist mouthfeel without any rough or dry feeling even if the once frozen dough is unfrozen and eaten. Incidentally, starch or a thickener may be further added into the dough liquid 1 so as to increase a moist feeling.

Step S2: Next, the thin baked dough 2 is wound around a mold member 3 having a shape narrowed toward a tip (e.g., a truncated conical shape).

Figure 4:
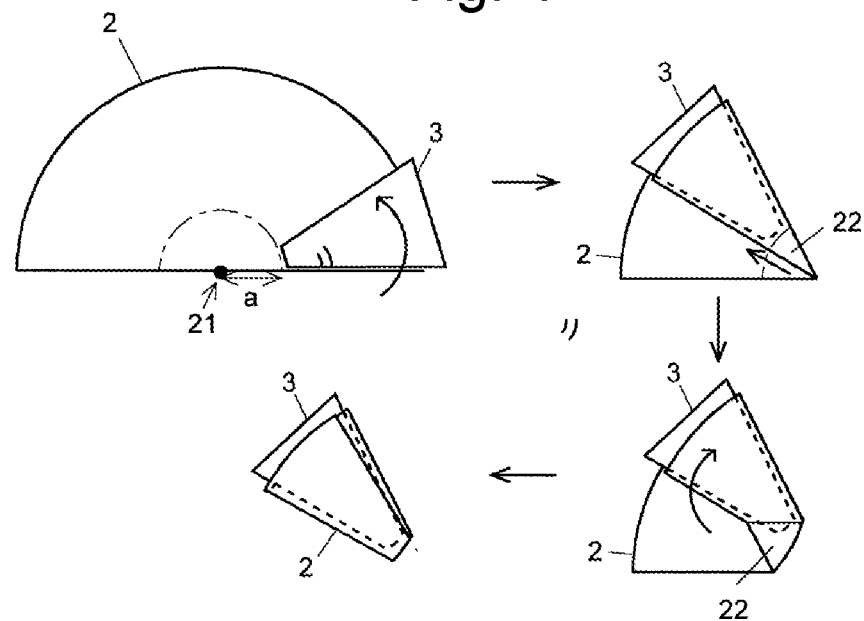
FIG. 4 is a view showing a second step.

The step S2 will be specifically explained with reference to FIG. 4.

First, the mold member 3 is placed on the semi-circular thin baked dough 2. At this time, the mold member 3 is placed in the state in which a busbar (i.e., a side along a slope) of the mold member 3 extends in the radial direction of the thin baked dough 2 and the tip of the mold member 3 is located apart by a predetermined distance α (preferably, e.g., 3 to 4 centimeters) from the center 21 of the circle of the thin baked dough 2.

Thereafter, the thin baked dough 2 is wound around the outer surface of the mold member 3 while the mold member 3 is rolled on its tip.

When about ⅘ of the thin baked dough 2 is wound around the mold member 3, a portion 22 of the thin baked dough 2 projecting from the tip of the mold member 3 is folded. That is to say, the thin baked dough 2 is wound around the mold member 3 such that a narrower end of the mold member 3 is covered with a portion of the thin baked dough 2. In this manner, a bottom 22 of a three-dimensional dough 20, described later, is formed.

And then, the residual thin baked dough 2 is wound around the outer surface of the mold member 3.

The mold member 3 used in the above-described step S2 is shown in, for example, FIG. 2.

As shown here, for example, the mold member 3 is formed into a truncated conical shape by rolling an arcuate thin plate 31 having a vertex cut in an arcuate manner in the shape of a truncated cone such that portions near both sides 32 and 33 (both ends in an arcuate direction) overlap. The thin plate 31 has elasticity. The thin plate 31 should be preferably made of a material excellent in thermal conductivity (e.g., stainless steel, more preferably, SUS 304). The mold member 3 used in molding the thin baked dough 2 having a diameter of 38 centimeters has, for example, a bottom having a diameter of 7 centimeters, the vertex having a diameter of 1 centimeter, and the busbar having a length of 15 centimeters.

It is preferable that the mold member 3 should have a rising piece 34 that rises inward on the side 33 located inside out of both sides 32 and 33 that overlap each other.

Moreover, the mold member 3 should preferably have a mark formed at a position at which the outer side 32 is located. More specifically, this mark may be a cutout 35 formed at the bottom of the mold member 3, as shown in FIG. 2, or may be formed by scribing or the like. The outer side 32 is located at the position of the mark (e.g., the cutout 35), thereby keeping the inner diameter of the mold member 3 constant.

Figure 5:
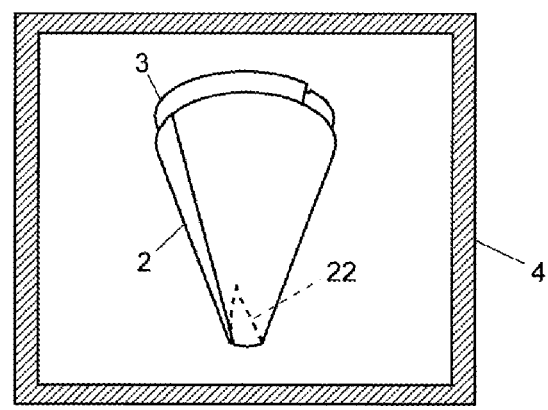
FIG. 5 is a view showing a third step.

Step S3: Subsequently, the thin baked dough 2 wound around the mold member 3 is frozen. More specifically, as shown in FIG. 5, the thin baked dough 2 wound around the mold member 3 is put into a blast chiller 4 whose temperature is adjusted at −30° C., followed by rapidly freezing, and then, is taken out in about 10 minutes. Since the thin baked dough 2 is frozen in a state wound around the mold member 3, the thin baked dough 2 is rigid (that is, its shape is rigid) in a manner wound around the mold member 3. In this manner, a dough (hereinafter also referred to as a "three-dimensional dough") 20 whose shape is rigid by freezing is obtained. The three-dimensional dough 20 has a three-dimensional shape in which one end is closed by the bottom 22 and the diameter is enlarged toward the other end.

Step S4: Finally, the mold member 3 and the three-dimensional dough 20 wound around the mold member 3 are separated from each other. In other words, the mold member 3 is detached from the three-dimensional dough 20.

Figure 6:
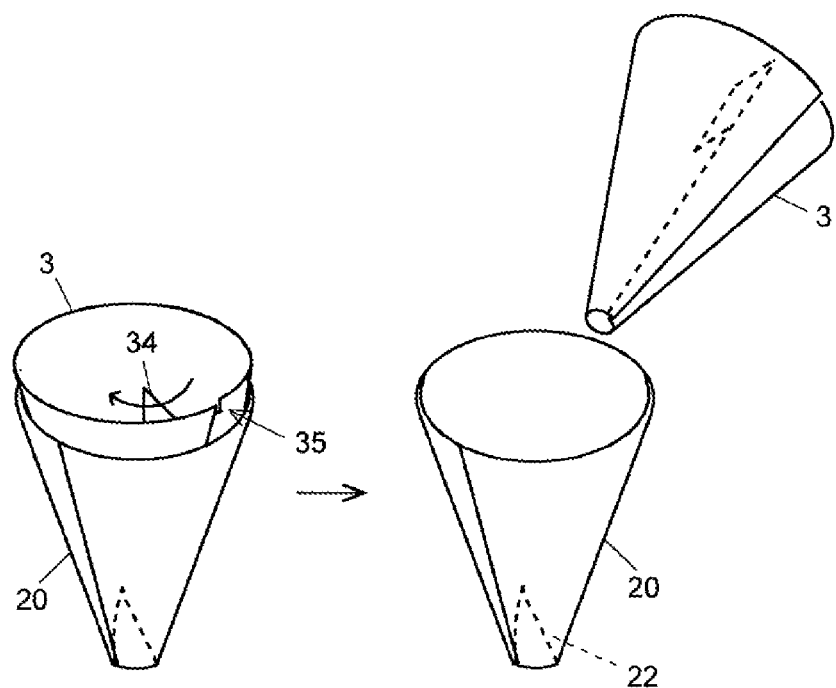
FIG. 6 is a view showing a fourth step.

More specifically, as shown in FIG. 6, the mold member 3 is deformed (i.e., the mold member 3 is puckered) such that the area of the overlapping portion of the thin plate 31 becomes large, and then, the outer surface of the mold member 3 is separated from the inner surface of the three-dimensional dough 20. In this state, the mold member 3 is withdrawn. In this manner, the mold member 3 is detached from the three-dimensional dough 20. This detachment manner can detach the mold member 3 without any damage even if, for example, a dough is fragile and delicate.

As described above, the mold member 3 has the rising piece 34 that rises inside. As a consequence, a finger or the like hooks the rising piece 34 while fixing the outer side 32, and then, the inner side 33 is moved along the inner circumferential surface of the mold member 3 (that is, the inner side 33 is moved relatively to the outer side 32), so that the mold member 3 can be easily puckered. In this manner, the mold member 3 and the three-dimensional dough 20 can be readily separated from each other.

As the mold member 3 is puckered many times in the above-described manner because of an increase in the use times of the mold member 3, there is a possibility that the inner diameter of the mold member 3 becomes smaller than the intended size. Here, since the cutout 35 is formed at a position at which the outer side 32 is to be located at the mold member 3, the shape is adjusted such that the outer side 32 is located at the position of the cutout 35 prior to the use of the mold member 3, whereby the inner diameter of the mold member 3 (and furthermore, the inner diameter of the three-dimensional dough 20) can be kept constant.

<3. Storage Method for Three-Dimensional Dough 20>

Figure 7:
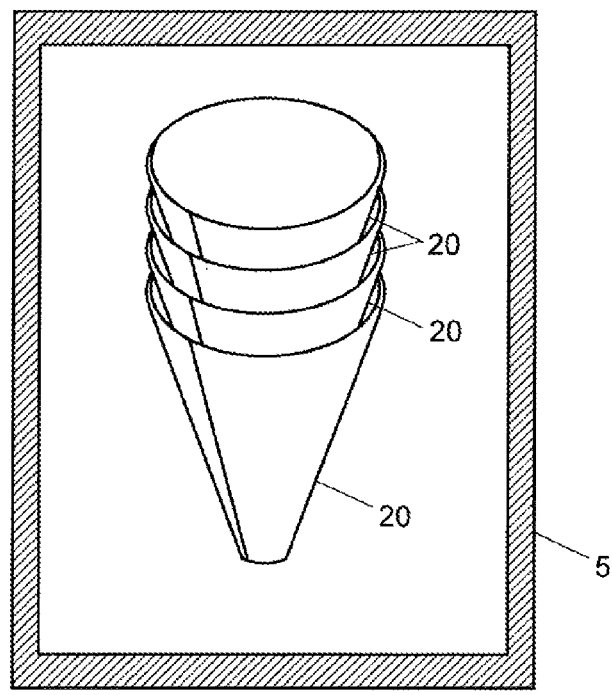
FIG. 7 is a view showing a storage state of a three-dimensional dough.

Next, a mode in which the three-dimensional dough 20 is stored will be explained with reference to FIG. 7. FIG. 7 is a view showing the storage state of the three-dimensional dough 20.

It is preferable that the three-dimensional dough 20 is previously produced and stored in a freezing manner. In particular, it is preferable that many three-dimensional doughs 20 are produced at a time, and then, are stocked in the freezing manner. For example, a freezer 5 whose inside temperature is kept at, for example, about −20° C. is just used in order to store the three-dimensional doughs 20. In the case where the three-dimensional doughs 20 are stored inside of the freezer 5 whose inside temperature is −20° C., their quality can be kept good for two months or more. At this time, as shown in FIG. 7, if a plurality of three-dimensional doughs 20 are stacked inside of the freezer 5, many three-dimensional doughs 20 can be stored in a small space.

<4. Usage of Three-Dimensional Dough 20>

Figure 8:
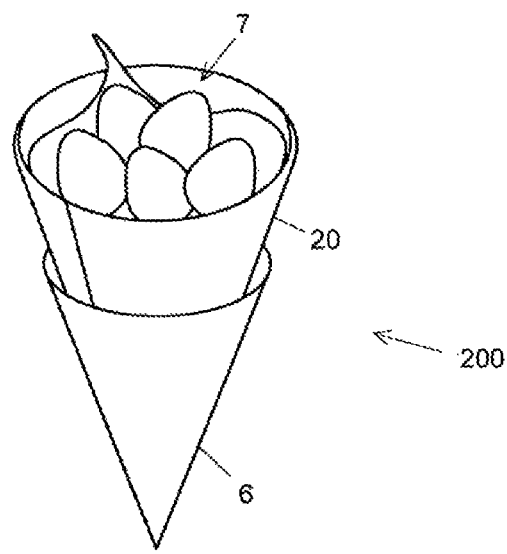
FIG. 8 is a view schematically showing a crepe that is produced with the three-dimensional dough and sold.

Subsequently, a mode in which a crepe is produced with the stocked three-dimensional dough 20 and sold will be described with reference to FIG. 8. FIG. 8 is a view schematically showing a crepe 200 that is produced with the three-dimensional dough 20 and sold.

First, only the required number of three-dimensional doughs 20 (e.g., the number of three-dimensional doughs 20 to be sold to customers) that are previously produced and stored in a freezing manner is unfrozen at any time. This unfreezing may be achieved naturally, for example. A time required for naturally unfreezing is about 5 minutes. In view of this, the three-dimensional dough 20 is simply taken out of the freezer 5 for natural unfreezing at a timing resulting from an inverse calculation that the unfreezing of the three-dimensional dough 20 is completed when a customer makes an order (or a customer receives a crepe 200).

Upon receipt of, for example, an order from a customer, the three-dimensional dough 20 (the three-dimensional dough 20 that is unfrozen or semi-unfrozen) is inserted into a conical stencil 6. And then, a filling 7 that is ordered by a customer is put into an opening of the three-dimensional dough 20. In this manner, the crepe 200 is completed, and then, is served to a customer.

In the above-described manner, with the three-dimensional dough 20, a simple work for putting the filling 7 upon receipt of an order from a customer completes the crepe 200. As a consequence, the crepe 200 can be speedily served.

Moreover, the three-dimensional dough 20 has the shape having one end closed and the diameter enlarged toward the other end, thereby dispensing with any skill for putting the filling 7. It means that any workers can easily produce the crepe 200 having a good appearance.

<5. Modifications>

Figure 9:
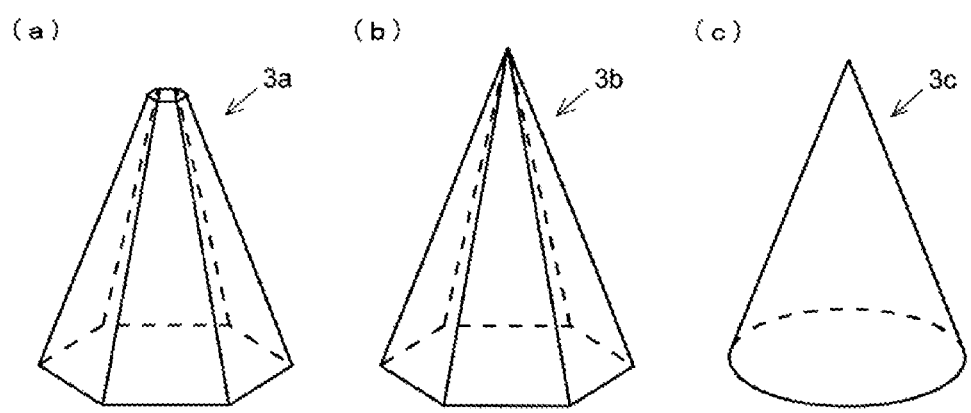
FIGS. 9(a) to 9(c) are views showing the configuration of mold members in modifications.

Although the mold member 3 is formed into the shape of a truncated cone in the above-described embodiment, the shape of the mold member 3 is not limited to this. For example, the shapes of the mold member 3 are exemplified by a polygonal truncated cone (a mold member 3a shown in FIG. 9(a)), a polygonal cone (a mold member 3b shown in FIG. 9(b)), and a cone (a mold member 3c shown in FIG. 9(c)), as shown in FIGS. 9(a) to 9(c), respectively.

Moreover, the vertex of each of the mold members 3, 3a, 3b, and 3c may be appropriately adjusted according to the three-dimensional dough 20 that is required. For example, in the case of the formation of a three-dimensional dough 20 having a relatively large opening diameter, the vertex is just enlarged. In contrast, in the case of the formation of a three-dimensional dough 20 having a relatively small opening diameter, the vertex is just reduced. Alternatively, in the case of the formation of a three-dimensional dough 20 having a relatively small overlapping portion, the vertex is just enlarged. In contrast, in the case of the formation of a three-dimensional dough 20 having a relatively large overlapping portion, the vertex is just reduced.

In the above-described embodiment, the thin baked dough 2 may be formed into shapes other than the semi-circular shape.

Figure 10:
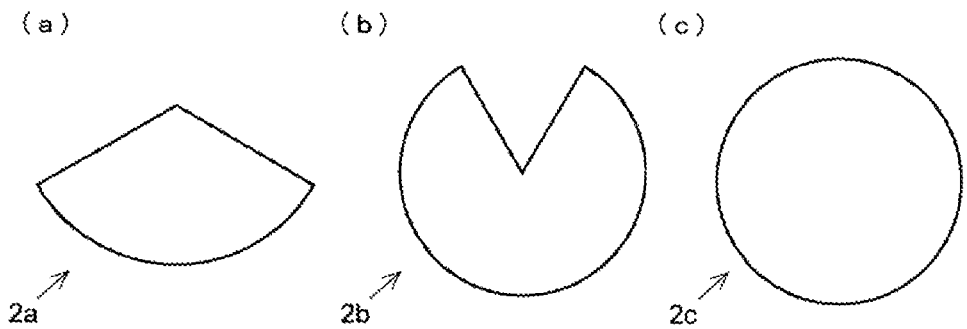
FIGS. 10(a) to 10(c) are views showing the forms of baked doughs according to the modifications.

For example, as shown in FIG. 10(*a*), a thin baked dough 2*a* formed into an arc having a center angle of 180° or less (e.g., an arc having a center angle of 120°) may be used. For example, an arcuate thin baked dough 2*a* having a center angle of 120° can be obtained by thinly extending and baking the dough liquid 1 in a circular shape and trisecting the resultant dough. The use of the arcuate and semi-circular thin baked doughs 2 and 2*a* having a center angle of 180° or less reduces the overlapping portions of the three-dimensional dough 20, thus achieving the crepe 200 having a good mouthfeel and the best balance between the dough and the filling 7 without strong taste of the dough. In addition, it is possible to save time required for unfreezing the three-dimensional dough 20.

Furthermore, in order to achieve the voluminousness of a dough, an arcuate thin baked dough 2*b* (FIG. 10(*b*)) having a center angle of more than 180° (e.g., an arc having a center angle of 240°) may be used, or a circular thin baked dough 2*c* (FIG. 10(*c*)) may be used. In the case where the circular thin baked dough 2*c* is used, it may be folded in half into a semi-circular shape, and then, it may be wound around the mold member 3.

In the above-described embodiment, the three-dimensional dough 20 is unfrozen, it is filled with the filling 7, and then, it is served to a customer. However, it is not always necessary to unfreeze the three-dimensional dough 20. The three-dimensional dough 20 may be filled with the filling 7 immediately after it is taken out of the blast chiller 4 or the freezer 5, and then, it may be served to a customer. In this case, ice cream or the like should be preferably used as the filling 7.

In the above-described embodiment, the explanation has been made on the case where the dough for a crepe is produced by using the producing method according to the present invention. However, the present invention is applicable to the production of doughs for various kinds of food except for a crepe (such as Hiroshima style okonomiyaki, Osaka style okonomiyaki, roll cake, omelet, and omelet rice).

REFERENCE SIGNS LIST

1 . . . Dough Liquid
2, 2*a*, 2*b*, 2*c* . . . Thin Baked Dough
22 . . . Bottom
20 . . . Three-dimensional Dough
200 . . . Crepe
3, 3*a*, 3*b*, 3*c* . . . Mold Member
31 . . . Thin Plate
32, 33 . . . Side of Thin Plate
34 . . . Rising Side
35 . . . Cutout
4 . . . Blast Chiller
5 . . . Freezer
6 . . . Stencil
7 . . . Filling

The invention claimed is:

1. A baked, shaped, and frozen product for holding food, the product comprising:
   a baked crepe dough sheet wound into a cone or a polygonal cone, wherein
   the baked crepe dough sheet is frozen after winding into the cone or the polygonal cone to make the cone or the polygonal cone retains its shape,
   the cone or the polygonal cone include a first end corresponding to a vertex that is a closed bottom, and a second end that is enlarged and open, and in a final shape the first end is folded,
   the shape includes a hollow conical interior that is empty, and
   the baked crepe dough sheet is not hardened in an unfrozen state.

2. The baked, shaped, frozen product according to claim 1, wherein the shape includes a single, uninterrupted, hollow conical interior.

3. The baked, shaped, frozen product according to claim 1, wherein the baked crepe dough sheet is semicircular in a flat state.

4. The baked, shaped, frozen product according to claim 1, wherein the baked crepe dough sheet is arcuate and semi-circular in a flat state.

* * * * *